United States Patent
Narimatsu et al.

(10) Patent No.: US 6,894,845 B2
(45) Date of Patent: May 17, 2005

(54) SYSTEM AND METHODS FOR PROVIDING A ZOOM LENS DEVICE

(75) Inventors: Shuji Narimatsu, Suwa (JP); Akitaka Yajima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 10/110,837

(22) PCT Filed: Aug. 20, 2001

(86) PCT No.: PCT/JP01/07130

§ 371 (c)(1),
(2), (4) Date: Apr. 17, 2002

(87) PCT Pub. No.: WO02/16994

PCT Pub. Date: Feb. 28, 2002

(65) Prior Publication Data

US 2002/0154276 A1 Oct. 24, 2002

(30) Foreign Application Priority Data

Aug. 18, 2000 (JP) ....................................... 2000-248694

(51) Int. Cl.[7] .............................................. G02B 14/15
(52) U.S. Cl. ...................... 359/685; 359/677; 359/679; 359/684; 359/686; 359/694; 359/699; 359/701; 359/703; 359/704
(58) Field of Search ................................ 359/685, 676, 359/677, 679, 684, 686, 694, 699, 701, 703, 704

(56) References Cited

U.S. PATENT DOCUMENTS

| | | | |
|---|---|---|---|
| 5,000,549 A | 3/1991 | Yamazaki | 359/557 |
| 5,880,892 A | 3/1999 | Ohtake | 359/683 |
| 6,075,653 A | 6/2000 | Narimatsu et al. | 359/686 |
| 6,151,171 A | 11/2000 | Kenin et al. | 359/684 |

FOREIGN PATENT DOCUMENTS

| | | |
|---|---|---|
| JP | U 63-88811 | 6/1988 |
| JP | A 1-219810 | 9/1989 |
| JP | A 4-345118 | 12/1992 |
| JP | A 5-66335 | 3/1993 |
| JP | A 7-84170 | 3/1995 |

Primary Examiner—Evelyn A. Lester
(74) Attorney, Agent, or Firm—Oliff & Berridge PLC

(57) ABSTRACT

The invention provides a zoom lens device that can include lens groups. A third lens group (compensator lens group) can be disposed between two lens groups (a second and a fourth lens groups) forming a variator lens group. The two lens groups (the second and fourth lens groups) forming the variator lens group can be retained by a common variator-lens frame and moved together. Accordingly, a zoom lens device, an optical apparatus, and a projector can be provided in which, even when a plurality of lens groups are assembled, degradation of optical characteristics due to decentering between the lens groups can be prevented.

18 Claims, 10 Drawing Sheets

FIG. 4
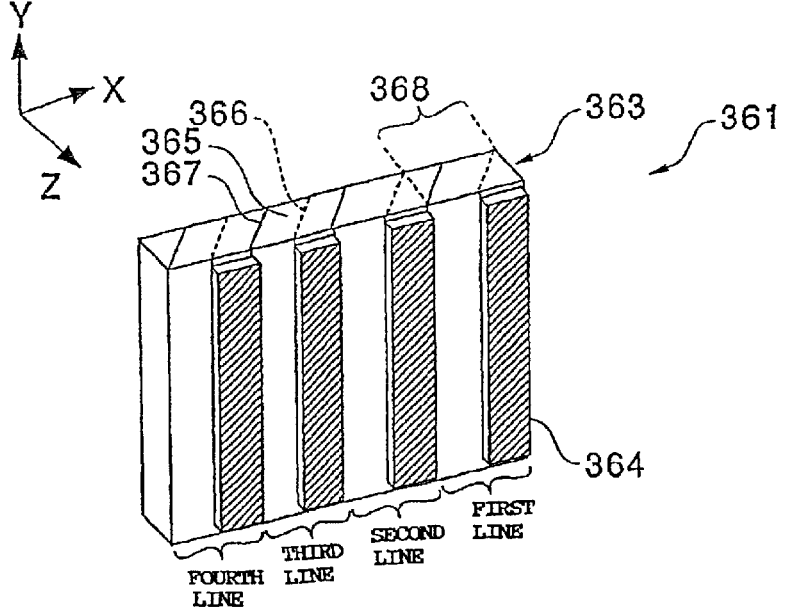
(A)
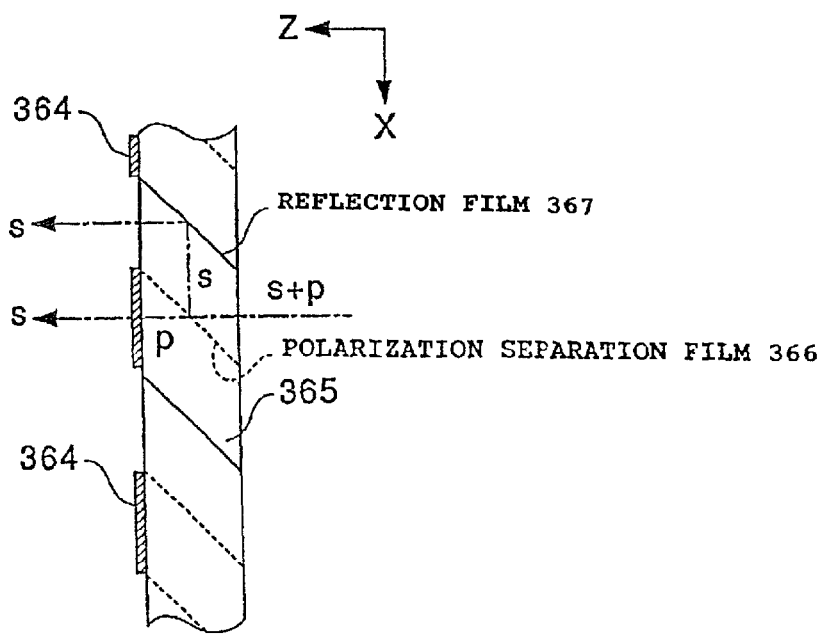
(B)

SYSTEM AND METHODS FOR PROVIDING A ZOOM LENS DEVICE

This is a U.S. National Stage of PCT/JP01/07130, filed Aug. 20, 2001, which claims priority of Japanese Application No. 2000-248694, filed Aug. 18, 2000.

BACKGROUND OF THE INVENTION

1. Field of Invention

The present invention relates to zoom lens devices, optical apparatuses using zoom lens devices, and projectors using zoom lens devices. More specifically, the present invention relates to a structure of a zoom lens device.

2. Description of Related Art

In apparatuses, such as projectors, single lens reflex cameras, video cameras, electronic cameras, medical equipment, and the like, zoom lens devices are used for performing zooming from wide angle to telephoto, or from telephoto to wide angle. In zoom lens devices, a plurality of lens groups, each group including one or more lenses, are arranged along the optical axis. The lens groups can include a focusing lens group and a variator lens group, which is used for changing magnification. The focusing lens group can include two lens groups, which move along the optical axis during the zooming operation. In addition, in zoom lens devices, the focal point changes as the variator lens group moves during the zooming operation. Thus, in order to compensate for the change in focal point, a compensator lens group, which moves in association with the variator lens group along the optical axis, is disposed between the two lens groups forming the variator lens group.

In a zoom lens device which is constructed as described above, the focusing lens group, the variator lens group, and the compensator lens group move along the optical axis during the zooming operation. Accordingly, the zoom lens device may be constructed such that the lens groups are retained by a common lens frame and are moved together. However, although described above as moving in association with the variator lens group, the compensator lens group should move in a different manner. Accordingly, when the focusing lens group, the variator lens group, and the compensator lens group are retained and moved together, appropriate compensation cannot be performed.

Therefore, in the known art, the moveable lens groups, such as the focusing lens group, the variator lens group, and the compensator lens group, which move along the optical axis during the zooming operation, are each retained by a lens frame and are driven individually. More specifically, although the two lens groups forming the variator lens group are moved in the same direction, they are retained by different lens frames and are driven individually.

In order to drive the lens groups, each of the lens frames retaining the moveable lens groups are provided with driving pins which project therefrom, and the driving pins are fitted inside cam grooves formed in a common zoom ring. Since the movement of each moveable lens groups along the optical axis during the zooming operation is determined by the cam grooves, each of the cam grooves is formed in a predetermined pattern corresponding to the movement of each of the moveable lens groups.

In the zoom lens devices of the known art, although decentering, that is, displacement between optical axes, in an individual lens group can be relatively easily corrected, the decentering between the lens groups cannot be corrected. Accordingly, there is a problem in that degradation of optical characteristics, for example, aberration and flare caused by aberration, due to decentering between the lens groups cannot be removed. In addition, when a fault, such as aberration and flare caused by the aberration, occurs due to the decentering between the lens groups, it requires extremely complex operations to determine which one of the lens groups has the problem. Thus, it is impossible to perform such operations in a mass production process.

SUMMARY OF THE INVENTION

In view of the above-described problem, an object of the present invention is to provide a structure of a zoom lens device having a plurality of lens groups, the structure being able to reduce the degradation of the optical characteristics due to the decentering between the lens groups.

In addition, another object of the present invention is to provide an optical apparatus and a projector in which the optical characteristics are improved by using the zoom lens device.

In order to solve the above-described problems, according to the present invention, a zoom lens device can include a variator lens group having two lens groups, which move along the optical axis during a zooming operation, and a compensator lens group which is disposed between the two lens groups and which moves in association with the variator lens group along the optical axis, the two lens groups being retained by a common variator-lens frame and being constructed such that the two lens groups move together.

According to the present invention, although the compensator lens group is disposed between the two lens groups forming the variator lens group, the two lens groups are retained by the common variator-lens frame and are constructed such that they move together. More specifically, although the two lens groups forming the variator lens group are disposed separately from each other with the compensator lens group therebetween, they move together during the zooming operation. Thus, the decentering between the two lens groups forming the variator lens group can be corrected. In order to prevent the degradation of the optical characteristics due to the decentering between the two lens groups, it is more effective to correct the decentering between the lens groups forming the variator lens group than to correct the decentering between other lens groups. This is because the effect of aberration, etc., due to the decentering of the lens groups forming the variator lens group is larger compared with other lens groups since the lens power of the lens groups forming the variator lens group is normally higher than other lens groups. According to the present invention, since the decentering between the two lens groups forming the variator lens group can be corrected, the degradation of the optical characteristics due to the decentering of the lenses can be effectively reduced.

In addition, according to the present invention, the structure can be made practically the same as the structure in which the number of lens groups is reduced by one, so that there is an advantage in that the decentering between the lens groups does not easily occur. Furthermore, the assembly process of the zoom lens device can be made less complex.

The present invention is effectively applied to a case in which the two lens groups forming the variator-lens group serve to counterbalance the influence of aberration due to the decentering. The reasons for this will be described below. When the two lens groups forming the variator lens group are retained by different lens frames as in the known art, the two lens groups may be decentered in different directions. In such a case, the degradation of the optical characteristics due to the decentering of the lens groups will be increased considerably. In contrast, in the present invention, the two lens groups forming the variator lens group are retained by a single variator-lens frame. Accordingly, even when the two lens groups forming the variator lens group are decentered, they are decentered in the same direction. Accordingly, if the two lens groups serve to counterbalance the effect of aberration, even when the variator lens group is decentered, the influence of aberration inside the variator lens group can be canceled, and the aberration can be reduced.

Although the present invention is effectively applied to a zoom lens device in which five lens groups are arranged along the optical axis, it should be understood that the present invention may also be applied to a zoom lens device in which six or more lens groups are arranged along the optical axis.

Preferably, the zoom lens device of the present invention can further include a compensator-lens frame which retains the compensator lens group, driving pins provided on the exterior surfaces of the variator-lens frame and the compensator-lens frame in such a manner that the driving pins project outward, and a zoom ring in which cam grooves are formed, the cam grooves guiding the driving pins and thereby restricting the movement of the moveable lens groups along the optical axis during the zooming operation. The variator-lens frame can preferably be provided with openings so that the driving pins which project from the compensator-lens frame reach the cam grooves. When such a structure is used, the zooming operation can be more easily performed.

In addition, according to the present invention, a lens group other than the variator lens group and the compensator lens group may be disposed at a position farthest from an image. In such a case, this lens group may serve to compensate for aberration, specifically field curvature aberration, so that the performance of the zoom lens device can be increased. In addition, this lens group may also serve to make the zoom lens device an approximately telecentric system. Therefore, in the case in which the zoom lens device of the present invention is installed in an optical apparatus, such as a projector, and the like, which requires a telecentric zoom lens device, it is advantageous to dispose a lens group other than the variator lens group and the compensator lens group at the position farthest from the image.

In such a case, only the lens group disposed at the position farthest from the image may be fixed and the remaining lens groups may be constructed as moveable lens groups which are able to move along the optical axis during the zooming operation, Alternatively, all of the lens groups may be constructed as moveable lens groups. In the case in which only the lens group disposed at the position farthest from the image is fixed the structure of the zoom lens device can be made simpler, so that the manufacturing cost can be reduced. Accordingly, an inexpensive and high-performance zoom lens device can be provided. In contrast, in the case in which all of the lens groups are constructed as moveable lens groups, the function of the lens group disposed at the position farthest from the image can be continuously obtained from wide angle to telephoto, so that the performance of the zoom lens device can be increased.

In the case in which a moveable lens group, other than the variator lens group and the compensator lens group is provided, the moveable lens group is preferably retained by a lens frame, and driving pins are preferably provided on the exterior surface of the lens frame in such a manner that the driving pins project outward. In addition, cam grooves, which guide the driving pins provided on the lens frame, and thereby restrict the movement of the moveable lens group along the optical axis during the zooming operation, are preferably formed in the zoom ring. When such a structure is applied, the zooming operation can be more easily performed. Since the variator lens group can be formed of two lens groups in the present invention, even when all of the moveable lens groups are guided by a single zoom ring as described above, the number of cam grooves for guiding the moveable lens groups can be reduced by the number corresponding to one lens group.

In the zoom lens device of the present invention, each of the lens groups can include one or more lenses.

The zoom lens device of the present invention may be installed in an optical apparatus such as a single lens reflex camera, a video-camera, an electronic camera, medical equipment, and the like.

In addition, the zoom lens device according to the present invention may also be installed in a projector in which a liquid crystal device, a modulation device using a micromirror, a CRT, etc., is used as an image forming device.

BRIEF DESCRIPTION OF THE DRAWINGS

The invention will be described with reference to the accompanying drawings, wherein like numerals reference like elements, and wherein:

FIG. 2 is a diagram showing an integrator illumination optical system which illuminates three liquid crystal devices, which are illumination areas in the projector shown in. FIG. 1;

In FIGS. 4, (A) is a perspective view showing the external appearance of a polarization conversion element array used in the integrator illumination optical system shown in FIG. 2, and (B) is a diagram showing the function of the polarization conversion element array;

DETAILED DESCRIPTION OF PREFERRED EMBODIMENTS

Embodiments of the present invention will be described below with reference to the accompanying drawings.

Although a zoom lens device according to the present invention may be used in various apparatuses, examples in which the zoom lens device is installed in a projector of magnification projection system will be described below.

Figure 1:
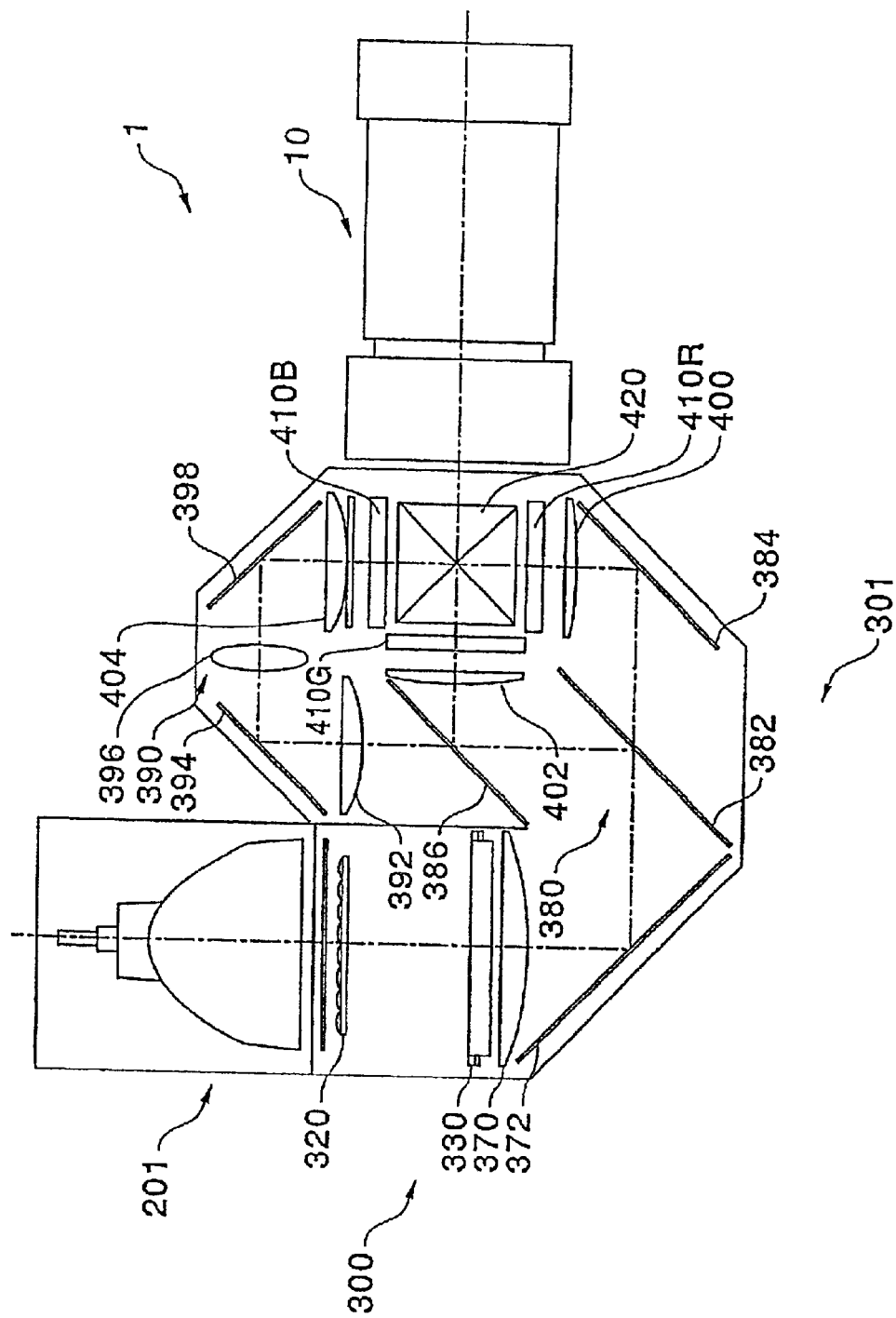
FIG. 1 is a schematic plan view showing the construction of an optical system of a projector.

FIG. 1 is a schematic plan view showing the construction of an optical system of a projector according to a first embodiment of the present invention. In the following descriptions, unless specifically described, the direction in which light moves is determined as the positive z axis. In addition, the 12 o'clock and 3 o'clock directions relative to the positive direction of the z axis are determined as the positive y axis and the positive x axis, respectively.

As shown in FIG. 1, a projector 1 can include a light source unit 201, an optical unit 301, and a zoom lens device 10 which serves as a magnification projection system. The optical unit 301 can further include an integrator optical system 300 having a first optical element 320, a second optical element 330, and a superimposing lens 370. In addition, the optical unit 301 includes a color separation optical system 380 having dichroic mirrors 382 and 386 and a reflection mirror 384. The optical unit 301 also includes a light guide optical system 390 having an entrance lens 392, a relay lens 396, and reflection mirrors 394 and 398. Furthermore, the optical unit 301 also includes three field lenses 400, 402, and 404, three liquid crystal devices 410R, 410G and 410B which form an image forming device, and a crossed dichroic prism 420.

The light source unit 201 is disposed at the incident side of the first optical element 320 in the optical unit 301, and the worn lens device 10 is disposed at the exit side of the crossed dichroic prism 420 in the optical unit 301.

Figure 2:
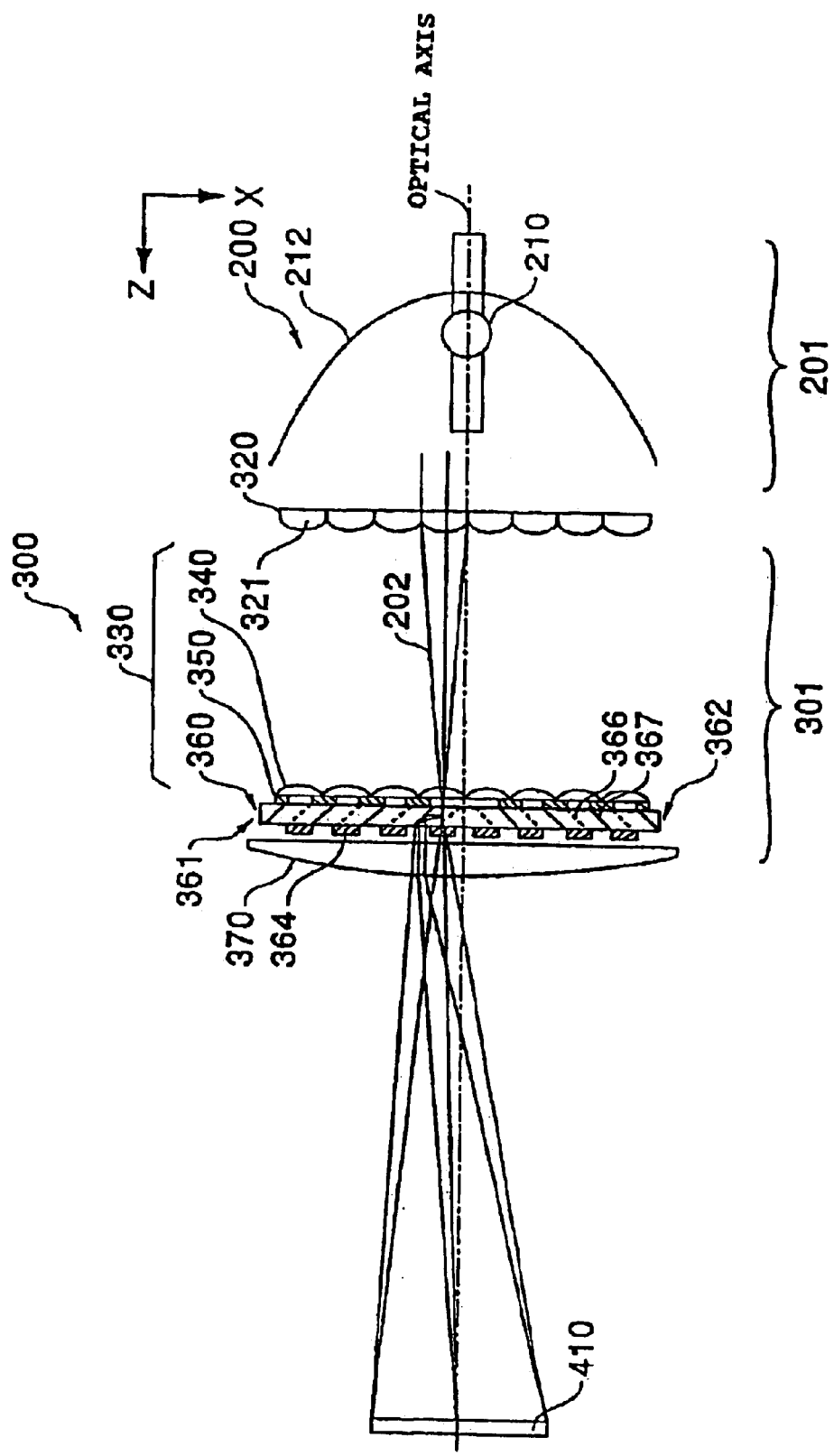
Figure 3:
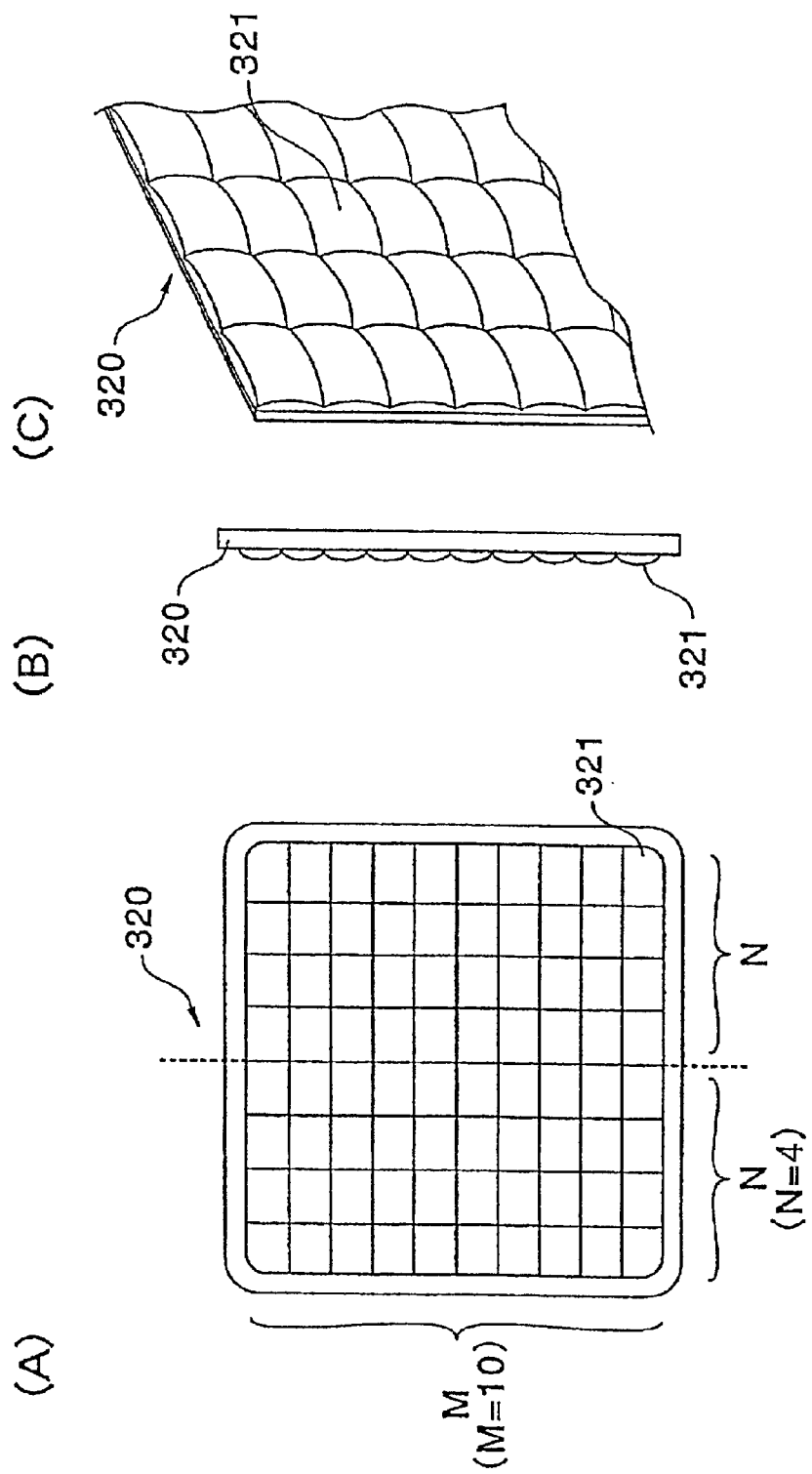
FIGS. 3, (A) and (B) are a front view and a side view showing the external appearance of a first optical element used in the integrator illumination optical system of the projector, and (C) is an enlarged perspective view of a part of the first optical element as seen from a side where small lenses are formed.

FIG. 2 is a diagram showing an integrator illumination optical system which illuminates the three liquid crystal devices, which are illumination areas in the projector 1 shown in FIG. 1 In FIGS. 3, (A) and (B) are a front view and aside view, respectively, showing the external appearance of the first optical element 320, and (C) is an enlarged perspective view of a part of the first optical element 320 as seen from the side where small lenses are formed. In addition, In FIG. 4, (A) is a perspective view showing the external appearance of a polarization conversion element array, and (B) is a diagram showing the function of the polarization conversion element array. In FIG. 2, in order to facilitate the explanation, only major components necessary for explaining the function of the integrator illumination optical system are shown.

With reference to FIG. 2, the integrator illumination optical system includes a light source 200 included in the light source unit 201 and the integrator optical system 300 included in the optical unit 301. The integrator optical system 300 includes the first optical element 320, the second optical element 330, and the superimposing leas 370, which is a third optical element. The second optical element 330 includes a condenser lens 340, a light shielding plate 350, and a polarization conversion element array 360.

The light source 200 includes a light source lamp 210 and a concave mirror 212. Radial light emitted from the light source lamp 210 is reflected by the concave mirror. 212, so that an approximately collimated light beam is emitted toward the first optical element 320. A halogen lamp, a metal halide lamp, a high-pressure mercury lamp or the like may be used as the light source lamp 210, and a parabolic mirror or an ellipsoidal mirror may be used as the concave mirror 212. The light source 200 may also be provided with a lens for collimating light emitted from the concave mirror 212.

With reference to FIGS. 3(A), (B), and (C), the first optical element 320 is a lens array in which small rectangular lenses 321 are arranged in a matrix pattern including M lines in the vertical direction and 2N lines in the horizontal direction. N lines of small lenses 321 are provided at each of the right and left sides across the center in the horizontal direction. In this example, M is 10 and N is 4. The shape of the small lenses 321 as seen from the z direction is approximately the same as the shape of the liquid crystal devices 410. For example, when the aspect ratio (the ratio of the horizontal size to the vertical size) of the image formation area of the liquid crystal devices is 4:3, the aspect ratio of the small lenses 321 is also set to 4:3. In addition, the condenser lens 340 of the second optical element 330 shown in FIG. 2 is also formed as a lens array that is constructed similarly to the first optical element 320 explained above with reference to FIG. 3. The first optical element 320 and the condenser lens 340 may face either the +z direction or the −z direction. In addition, the first optical element 320 and the condenser lens 340 may face opposite directions as shown in FIG. 2.

As shown in FIG. 2, the polarization conversion element array 360 is constructed of two polarization conversion element arrays 361 and 362 which are disposed symmetrically about the optical axis.

As shown in FIG. 4(A), the polarization conversion element array 361 includes a polarization beam splitter array 363 and $\lambda/2$ retardation films 364 (shaded in the figure) disposed on the exit surface of the polarization beam splitter array 363 at predetermined positions. The polarization beam splitter array 363 is constructed by joining a plurality of light transmissive members 365, each of which has a shape like a column that is parallelogram in cross section. A polarization separation film 366 and a reflection film 367 are alternately formed at the interfaces between the light transmissive members 365. The $\lambda/2$ retardation films 364 are attached on the exit surface of the polarization beam splitter array 363 selectively at parts corresponding to the projection areas of either polarization separation films 366 or reflection films 367 in the x direction. In the present example, the $\lambda/2$ retardation films 364 are laminated at parts corresponding to the projection areas of the polarization separation films 366 in the x direction.

The above-described polarization conversion element array 361 serves to convert light incident thereto to only one kind of linearly polarized light (for example, s-polarized light or p-polarized light).

More specifically, as shown in FIG. 4(B), when unpolarized light including s-polarized light component and p-polarized light component (light having random polarization) is incident on the polarization conversion element array 361, the incident light is separated into s-polarized light and p-polarized light by the polarization separation films 366. s-polarized light is reflected by the polarization separation films 366 in an approximately perpendicular direction, is reflected by the reflection films 367, and is then emitted. In contrast, p-polarized light passes through the polarization separation film 366. Since the $\lambda/2$ retardation films 364 are disposed at regions where the p-polarized light, which has passed through the polarization separation films, is emitted, the p-polarized light is converted to s-polarized light before it is emitted. Accordingly, light that passes through the polarization conversion element array 361 is almost completely converted to s-polarized light. Light that passes through the polarization conversion element array 361 may also be converted to p-polarized light by disposing the $\lambda/2$ retardation films 364 at regions where s-polarized light, which is reflected by the reflection film 367, is emitted.

Thus, in the polarization, conversion element array 361, a unit including one polarization separation film 366 and one reflection film 367, which are adjacent to each other, and one λ/2 retardation film 364 can be considered as a polarization conversion element 368. Accordingly, the polarization conversion element array 361 can be constructed by arranging a plurality of polarization conversion elements 368 in the x direction. In the present example, the polarization conversion element array 361 includes four lines of polarization conversion elements 368. The polarization conversion element array 362 is constructed in completely the same manner as the polarization conversion element array 361, and explanations thereof are thereby omitted.

In the projector 1 which is constructed as described above, unpolarized light emitted by the light source 200 shown in FIG. 2 is separated into a plurality of sub-beams 202 by the small lenses 321 of the first optical element 320 and small lenses 341 of the condenser lens 340 included in the second optical element 330, which form the integrator optical system 300 The sub-beams 202 are condensed on the polarization separation films 366 of the two polarization conversion element arrays 361 and 362. The condenser lens 340 serves to guide the plurality of sub-beams emitted from the first optical element 320 such that the sub-beams are condensed on the polarization separation films 366 of the two polarization conversion element arrays 361 and 362 Accordingly, as described above with reference to FIG. 4(B), the sub-beams incident on the two polarization conversion element arrays 361 and 362 are converted to only one kind of linearly polarized light beams before they are emitted. The light beams emitted from the two polarization conversion element arrays 361 and 362 are superimposed on the liquid crystal devices, which will be described in greater detail below, by the superimposing lens 370. Accordingly, the liquid crystal devices are uniformly illuminated by the above-described integrator illumination optical system.

As shown in FIG. 1, a reflection mirror 372 is provided in order to guide the light emitted from the superimposing lens 370 toward the color separation optical system 380. However, the reflection mirror 372 may not be necessary depending on the construction of the illumination optical system.

The color separation optical system 380 can include two dichroic mirrors 382 and 386 and serves to separate the light emitted from the superimposing lens 370 into red, green, and blue light components. The first dichroic mirror 382 passes the red light component of the light emitted from the superimposing lens 370 and reflects the blue and green colored light components. The red light component that has passed through the first dichroic mirror 382 is reflected by the reflection mirror 384, passes through a field lens 400, and reaches the liquid crystal device 410R provided for the red light component. The field lens 400 serves to convert the light beams emitted from the superimposing lens 370 into light that is parallel to the central axis (chief ray) thereof. Other field lenses 402 and 404 disposed in front of the liquid crystal devices 410G and 410B, respectively, have the same function.

After the blue and green light components have been reflected by the first dichroic mirror 382, the green light component is reflected by the second dichroic mirror 386, passes through the field lens 402, and reaches the liquid crystal device 410G for the green light component. On the other hand, the blue light component passes through the second dichroic mirror 386 and the light guide optical system 390 including the entrance lens 392, the reflection mirror 394, the relay lens 396, and the reflection mirror 398.

Then, the blue light component passes through the field lens 404 and reaches the liquid crystal device 410B for the blue light component. Since the light path of the blue light component is longer than the other light components, the blue light component is guided through the light guide optical system 390 in order to prevent the degradation of the utilization ratio of light due to diffusion, etc., in other words, in order to transfer the light incident on the entrance lens 392 to the field lens 404 without causing any change.

The liquid crystal devices 410R, 410G, and 410B include a pair of polarizing plates and a liquid crystal panel disposed between the polarizing plates and serve to modulate the light incident thereto based on an image information. Since such liquid crystal devices 410R, 410G and 410B are weft known in the art, detailed explanations thereof are omitted The light components modulated by the liquid crystal devices 410R, 410G, and 410B, are incident on the crossed dichroic prism 420. The crossed dichroic prism 420 serves as a colored-light combining optical system which combines the light components of three colors, which are modulated by the liquid crystal devices 410R, 410G, and 410B. The crossed dichroic prism 420 can include a dielectric multi-layer film that reflects the red light component and a dielectric multilayer film that reflects the blue light component, which are formed in a letter-X shape along the interfaces of four right-angle prisms. The light components of three colors, which are modulated, are combined by the dielectric multilayer films. The combined light obtained by the crossed dichroic prism 420 is emitted toward the zoom lens device 10, which serves to project the combined light on a projection area such as a screen, etc.

Figure 5:
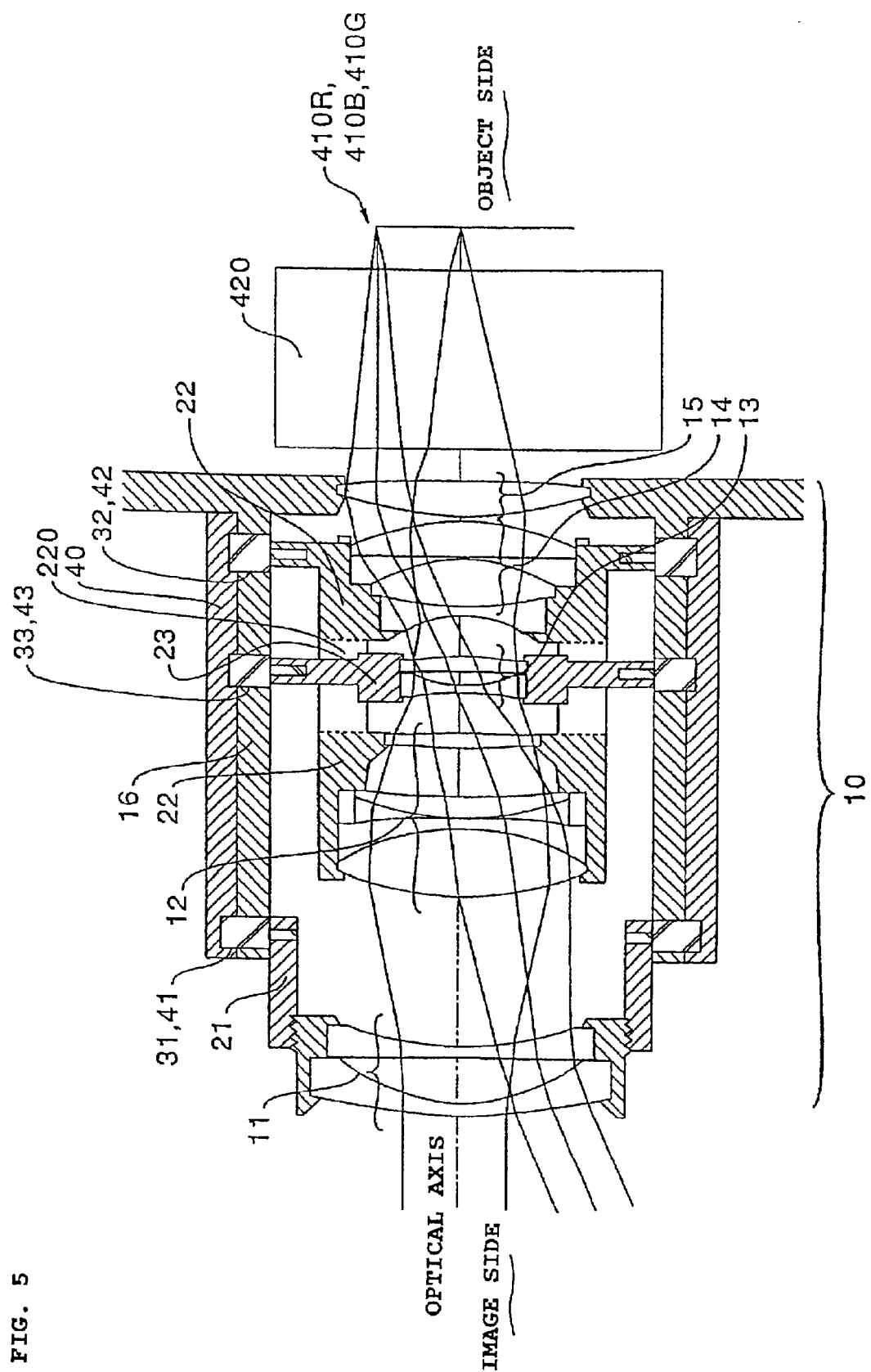
FIG. 5 is a sectional view showing lenses used in the zoom lens device according to the first embodiment of the present invention.
Figure 6:
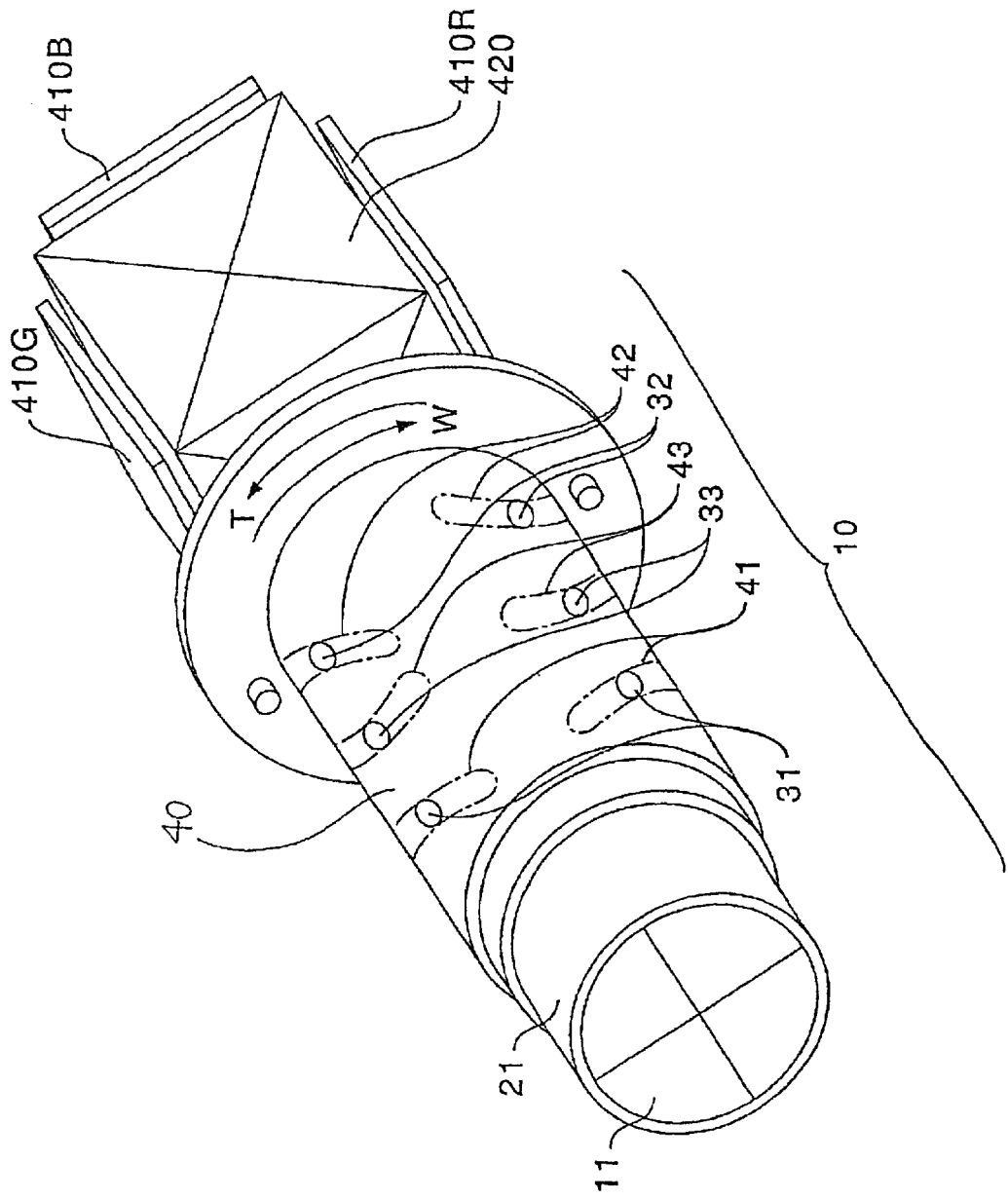
FIG. 6 is a schematic perspective view showing the exterior appearance of the zoom lens device shown in FIG. 5.
Figure 7:
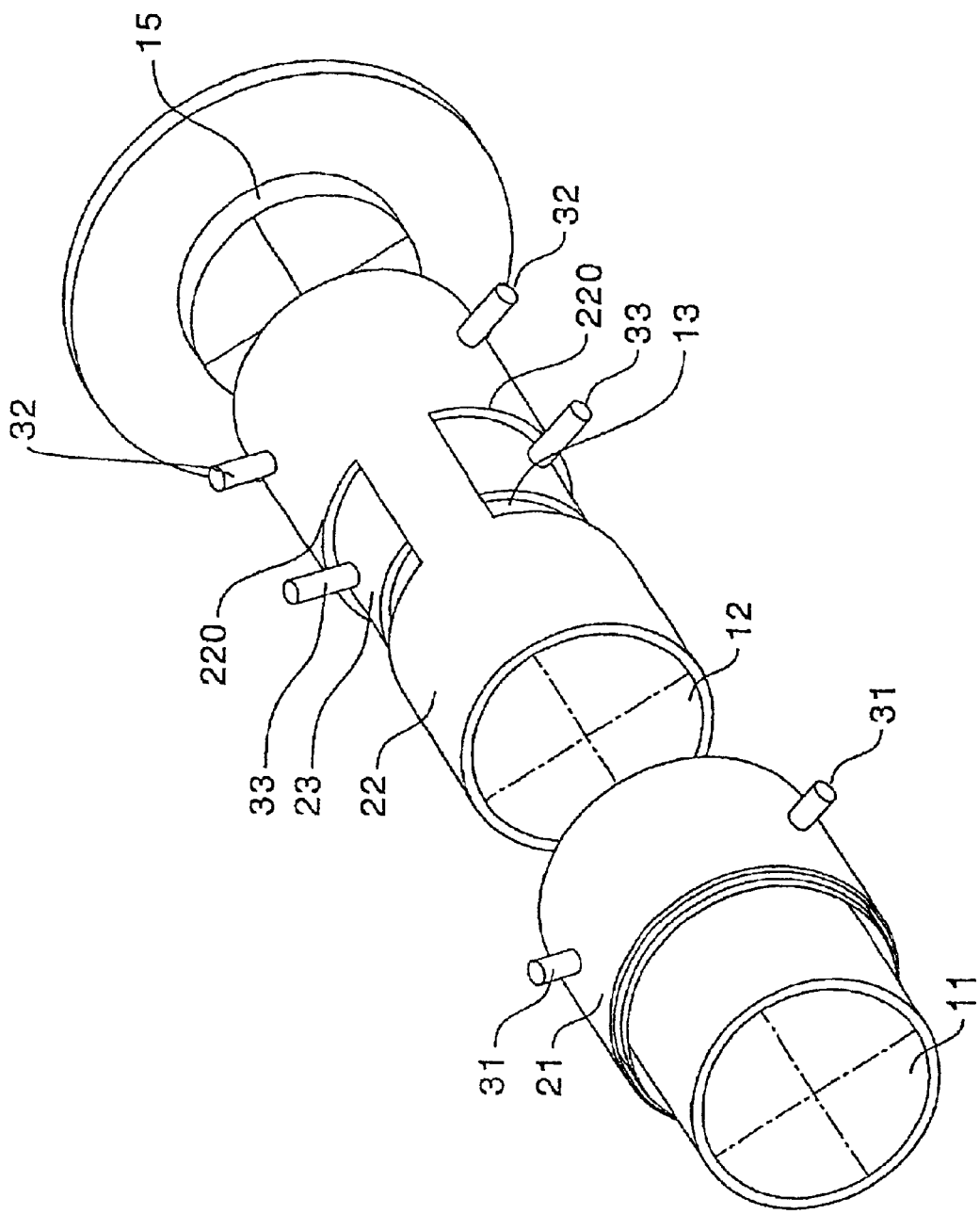
FIG. 7 is a schematic perspective view of the zoom lens device shown in FIG. 5 from which a zoom ring, etc., are removed.
Figure 8:
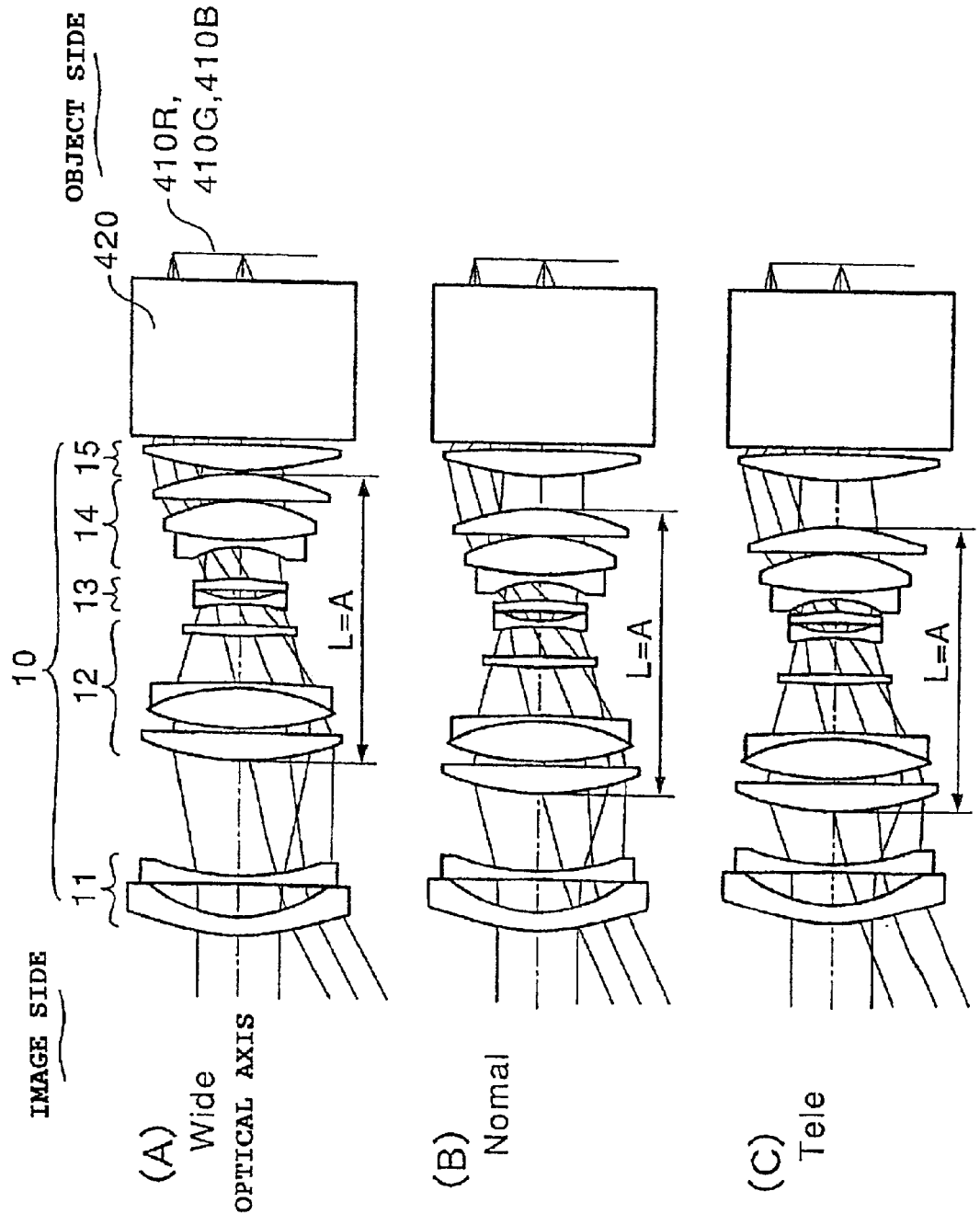
In FIGS. 8, (A), (B), and (C) are diagrams showing lenses in the zoom lens device shown in FIG. 5 at wide angle, normal state, and telephoto positions, respectively.

The construction of the zoom lens device 10 used in the projector 1 will be described below with reference to FIGS. 5 to 8. FIG. 5 is a sectional view showing lenses used in the zoom lens device 10. FIG. 6 is a schematic perspective view showing the exterior appearance of the zoom lens device 10, and FIG. 7 is a schematic perspective view of the zoom lens device 10 from which a zoom ring and a fixing frame are removed. In FIGS. 8, (A), (B), and (C) are diagrams showing lenses in the zoom lens device 10 at wide angle, normal, and telephoto positions, respectively With reference to FIG. 5, a plurality of lens groups, each group including one or more lenses, are arranged along the optical axis in the zoom lens device 10 of the present embodiment. In the present embodiment, first to fifth lens groups 11, 12, 13, 14, and 15, of which the power is negative, positive, negative, positive, and positive, respectively, are provided. In the lens groups, the first lens group 11, which is disposed at a position closest to an image, is a focusing lens group.

The second and fourth lens groups 12 and 14 form a variator lens group which mainly serves to change magnification. The second and fourth lens groups 12 and 14 counterbalance the influence of aberration due to the decentering. For example, when the decentering of the variator lens group occurs, the direction of the second lens group 12 that causes flare due to aberration and the direction of the fourth lens group 14 that causes flare due to aberration are opposite to each other.

In addition, the third lens group 13, which moves in association with the second and fourth lens groups 12 and 14 along the optical axis, is disposed between the second and fourth lens groups 12 and 14 as a compensator lens group. The third lens group 13 mainly serves to compensate for the displacement of the focal position caused by the movement of the second and fourth lens groups 12 and 14 (variator lens group) during the zooming operation The first lens group 11 also has the above-described function as a compensator.

The fifth lens group 15, which is disposed at a position farthest from the image, is fixed to a fixing frame 16, and is constructed as a fixed lens group which does not move during the zooming operation. The fifth lens group 15 serves to make the zoom lens device 10 an approximately telecentric system, and to compensate specifically for field curvature aberration in various kinds of aberrations.

The first to fourth lens groups are constructed as moveable lens groups which move during the zooming operation. In the first to fourth lens groups 11 to 14, the second and fourth lens group 12 and 14 move together, and the first lens group 11 and the third lens group 13 move independently from each other.

The structure for moving the lens groups according to the present embodiment will be described below.

The first lens group 11 is retained by a focusing-lens frame 21, which has a cylindrical shape and which is able to move inside the fixing frame 16 along the optical axis. In addition, the third leas group 13 is retained by a compensator-lens frame 23, which also has a cylindrical shape and which is able to move inside the fixing frame 16 along the optical axis. The focusing-lens frame 21 and the compensator-lens frame 23 are constructed such that they do not rotate around the optical axis.

The third lens group 13 is disposed between the second and fourth lens groups 12 and 14. Thus, the second and fourth lens groups 12 and 14 are disposed separately from each other. In addition, the second and fourth lens groups 12 and 14 are retained by a common variator-lens frame 22, which also has a cylindrical shape and which is able to move inside the fixing frame 16 along the optical axis. The variator-lens frame 22 is also constructed such that it does not rotate around the optical axis.

As shown in FIGS. 5, 6, and 7, a plurality of driving pins 31, 32, and 33 are provided on the exterior surfaces of the focusing-lens frame 21, the variator-lens frame 22, and the compensator-lens frame 23, in such a manner that the driving pins 31, 32, and 33 project outward in the same angular directions. In addition, the driving pins 31, 32, and 33 are provided with rollers, which are able to rotate around the axis, at the ends thereof.

The compensator-lens frame 23 is covered by the variator-lens frame 22. Thus, openings 220 are formed in the variator-lens frame 22 at parts corresponding to the parts at which the driving pins 33 are formed on the compensator-lens frame 23.

In addition, the fixing frame 16 is mounted with a zoom ring 40 at the exterior of the cylindrical part thereof, and the zoom ring 40 is able to rotate around the optical axis but does not move along the optical axis.

The zoom ring 40 is provided with three cam grooves 41, 42, and 43, into which the driving pins 31, 32, and 33, which project from the focusing-lens frame 21, the variator-lens frame 22, and the compensator-lens frame 23, respectively, are inserted The driving pins 33 are inserted through the openings 220 formed in the variator-lens frame 22 and into the cam grooves 43.

When the zooming operation is performed by rotating the zoom ring 40 around the optical axis manually or by an automatic driving mechanism, the cam grooves 41, 42, and 43 move the corresponding lens frames (the focusing-lens frame 21, the variator-lens frame 22, and the compensator-lens frame 23) along the optical axis in manners that are determined individually. Accordingly, the cam grooves 41, 42, and 43 serve to move the first to fourth lens groups 11 to 14 along the optical axis in manners that are determined individually. Therefore, the cam grooves 41, 42, and 43 are formed in different patterns.

In the above-described zoom lens device 10, when a zooming operation from the normal state shown in FIG. 8(B) to wide angle is performed, the zoom ring 40 is rotated in a direction shown by the arrow W in FIG. 6. Accordingly, as shown in FIG. 8(A), the first lens group 11 does not move along the optical axis due to the shape of the cam groove 41. In addition, the second and fourth lens groups 12 and 14 move toward an object along the optical axis due to the shape of the cam groove 42, so that the distance between the first and second lens groups 11 and 12 and the distance between the first and fourth lens groups 11 and 14 are increased. The third lens group 13 also moves toward the object along the optical axis due to the shape of the cam groove 43.

When a zooming operation from the normal state shown in FIG. 8(B) to telephoto is performed, the zoom ring 40 is rotated in a direction shown by the arrow T in FIG. 6. Accordingly, as shown in FIG. 8(C), the first lens group 11 moves toward the object along the optical axis due to the shape of the cam groove 41. In addition, the second and fourth lens groups 12 and 14 move toward the image along the optical axis due to the shape of the cam groove 42, so that the distance between the first and second lens groups 11 and 12 and the distance between the first and fourth lens groups 11 and 14 are reduced. The third lens group 13 also moves toward the image along the optical axis due to the shape of the cam groove 43.

As described above, in the zoom lens device 10 of the present embodiment, the third lens group 13 (compensator lens group) is disposed between the two lens groups (the second and forth lens groups 12 and 14) forming the variator lens group. However, the two lens groups are retained by a common variator-lens frame 22 and are constructed such that the two lens groups move together. More specifically, although the second and fourth lens groups 12 and 14 are disposed separately from each other with the third lens group 13 therebetween, they move together during the zooming operation. Thus, decentering between the two lens groups forming the variator lens group can be corrected. Accordingly, the degradation of the optical characteristics due to the decentering of the lenses can be, effectively reduced.

In addition, since the structure can be made practically the same as the structure in which the number of lens groups is reduced by one, there is an advantage in that the decentering between the lens groups does not easily occur. In addition, the assembly process of the zoom lens device 10 can be made simpler.

In addition, since the second and fourth lens groups 12 and 14 forming the variator lens group serve to counterbalance the influence of aberration due to the decentering between the two lens groups, even when the decentering occurs in the variator lens group, influence of aberration inside the variator lens group can be canceled. Accordingly, the aberration can be reduced.

In addition, the variator-lens frame 22 is provided with the openings 220 so that the driving pins 33, which project from the compensator-lens frame 23, can reach the cam grooves 43 formed in the zoom ring 40, and the lens groups 12 and 14 forming the variator lens group and the lens group 13 forming the compensator lens group are guided by a single zoom ring 40. Accordingly, the zooming operation can be easily performed.

In addition, the fifth lens group 15, which serves to make the zoom lens device 10 an approximately telecentric system and to compensate specifically for the field curvature aberration in various kinds of aberrations, is disposed at the position farthest from the image. Thus, according to the structure of the present embodiment, the performance of, the zoom lens device can be increased. The zoom lens device according to the present embodiment is suitably installed in an optical apparatus such as a projector, etc., which requires a telecentric zoom lens device.

In addition, the fifth lens group 15 is fixed to the fixing frame 16, and is constructed as a fixed lens group which does not move during the zooming operation. Thus, according to the structure of the present embodiment, an inexpensive and high-performance zoom lens device can be provided.

In addition, in the zoom lens device 10 of the present embodiment, the cam grooves 41 to 43 for guiding the moveable lens groups 11 to 14 are all formed in a single zoom ring 40. More specifically, the moveable lens groups 11 to 14 are all guided by a single zoom ring 40. Accordingly, zooming operation can be easily performed. In the zoom lens device 10 of the present embodiment, since the two lens groups 12 and 14 forming the variator lens group is retained by a single lens frame 22, the number of cam grooves for guiding the moveable lens groups is reduced by the number corresponding to one lens group.

A zoom lens device according to a second embodiment of the present invention will be described below with reference to FIGS. 9 and 10.

Figure 9:
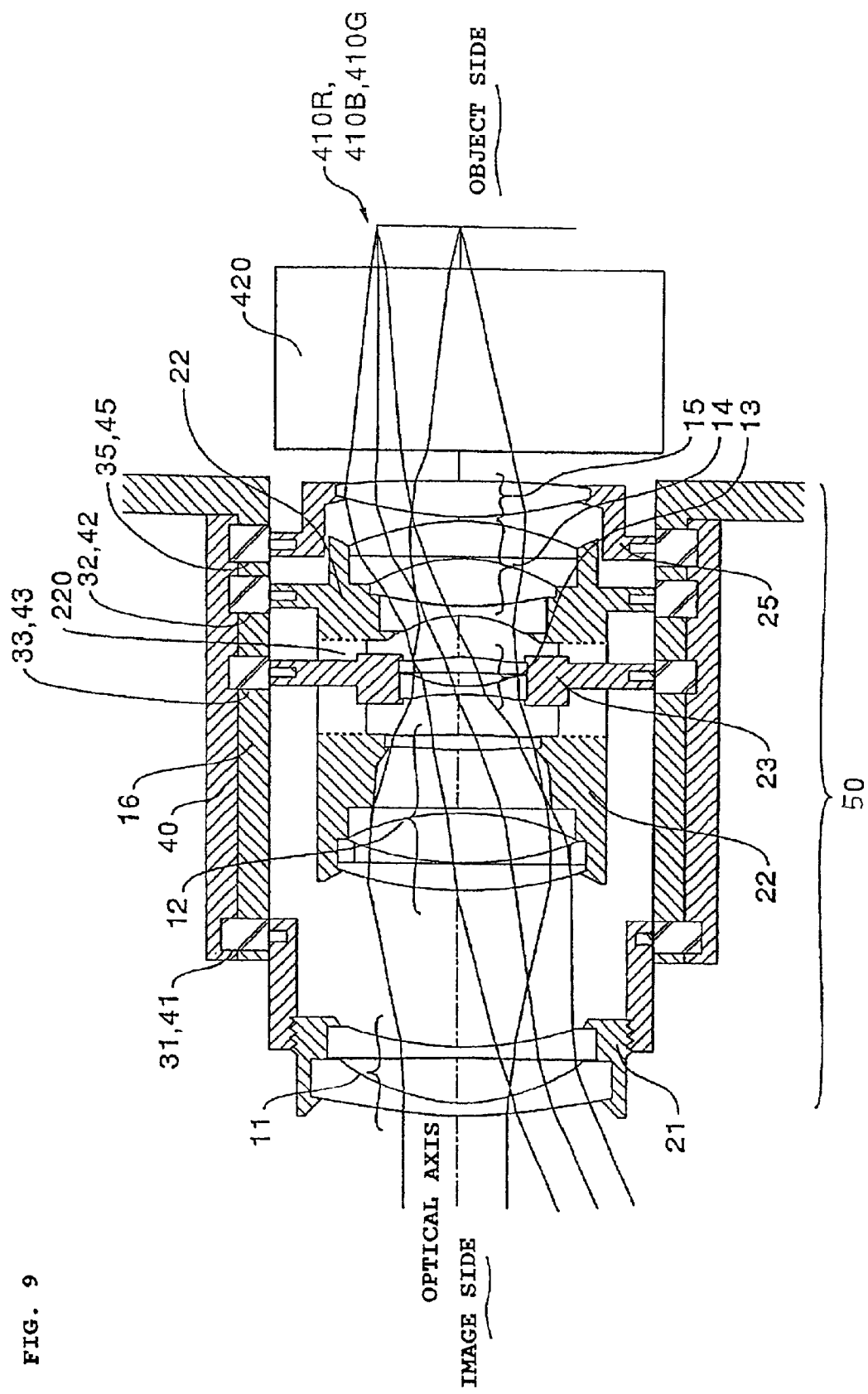
FIG. 9 is a sectional view showing lenses used in a zoom lens device according to a second embodiment of the present invention; and In FIGS. 10, (A), (B), and (C) are diagrams showing lenses in the zoom lens device shown in FIG. 9 at wide angle, normal state, and telephoto positions, respectively.
Figure 10:
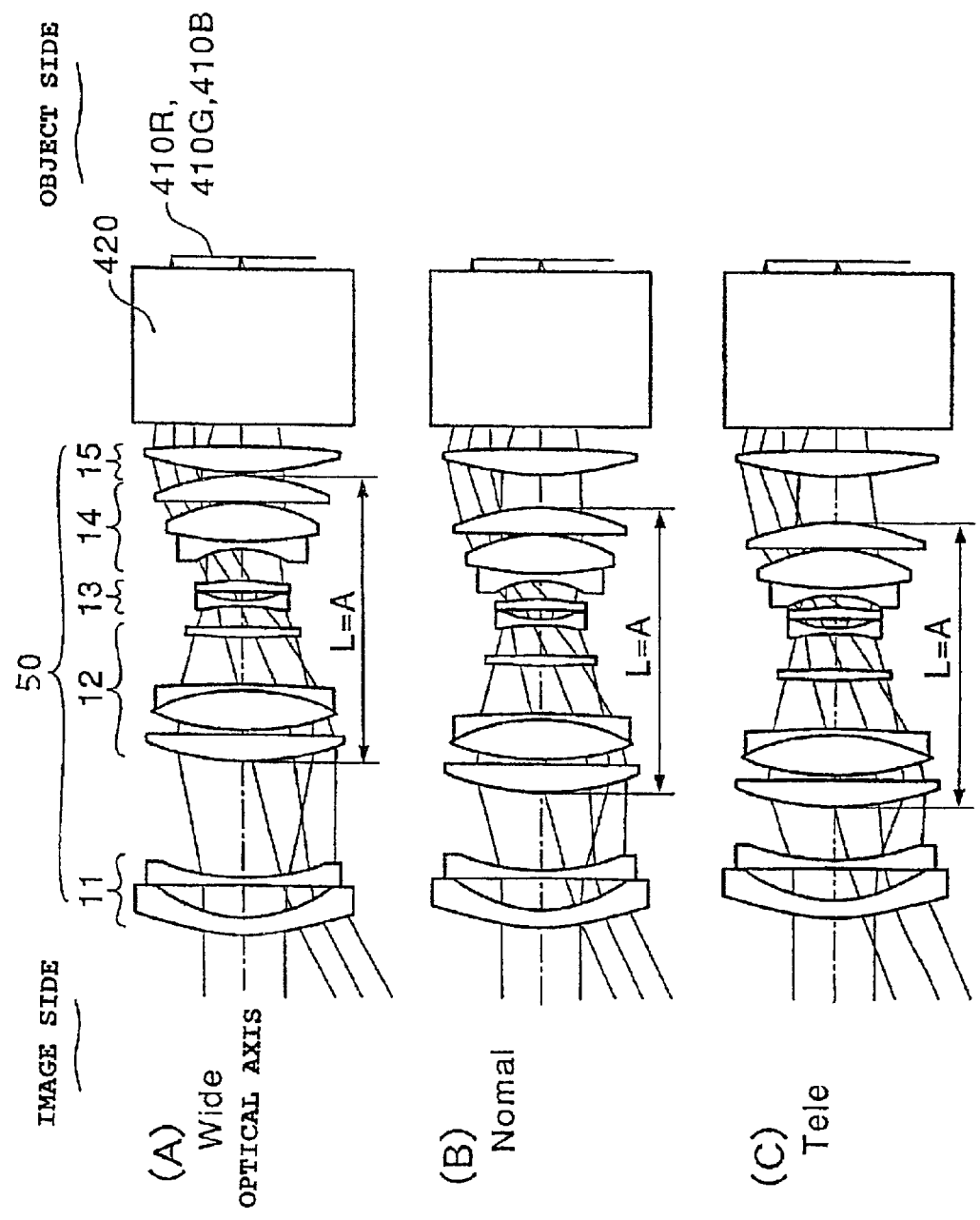

FIG. 9 is a sectional view showing leases used in a zoom lens device to which the present invention is applied. In FIGS. 10, (A), (B), and (C) are diagrams showing lenses in the zoom lens device in wide angle, normal, and telephoto positions, respectively. Similarly to the first embodiment, the zoom lens device of the present embodiment may also be installed in a projector. In addition, the basic construction of the zoom lens device according to the present embodiment is the same as that of the zoom lens device 10 according to the first embodiment. Accordingly, components similar to those in the first embodiment are denoted by the same reference numerals and detailed explanations thereof are omitted.

With reference to FIG. 9, similarly to the first embodiment, a plurality of lens groups, each group including one or more lenses, are arranged along the optical axis in a zoom lens device 50 of the present embodiment in the present embodiment, first to fifth lens groups 11, 12, 13, 14, and 15, which serve similarly to the first embodiment, are provided.

In the present embodiment, the first to fifth lens groups 11 to 15 are all constructed as moveable lens groups, and the present embodiment differs from the first embodiment in that the fifth lens group 15 is not fixed to the fixing frame 16. In the present embodiment, the fifth lens group 15 is retained by a cylindrical lens frame 25 which is able to move inside the fixing frame 16 along the optical axis. The lens frame 25 is constructed such that it does not rotate around the optical axis.

In addition, also in the present embodiment, the first lens group 11 is retained by the focusing-lens frame 21, which has a cylindrical shape and which is able to move inside the fixing frame 16 along the optical axis. In addition, the third lens group 13 is retained by the compensator-lens frame 23, which also has a cylindrical shape and which is able to move inside the fixing frame 16 along the optical axis.

Furthermore, the third lens group 13 is disposed between the second and fourth lens groups 12 and 14 More specifically, the second and fourth lens groups 12 and 14 are disposed separately from each other but are retained by the common variator-lens frame 22.

A plurality of driving pins 31, 32, 33, and 35 are provided on the exterior surfaces of the focusing-lens frame 21, the variator-lens frame 22, the compensator-lens frame 23, and the lens frame 25 in such a manner that the driving pins 31, 32, 33, and 35 project outward in the same angular directions. Since the compensator-lens frame 23 is covered by the variator-lens frame 22, openings 220 are formed in the variator-lens frame 22 at parts corresponding to the parts at which the driving pins 33 are formed on the compensator-lens flame 23.

In addition, the fixing frame 16 is mounted with a cylindrical zoom ring 40 at the exterior of the cylindrical part thereof, and the zoom ring 40 is provided with cam grooves 41, 42, 43, and 45. The driving pins 31, 32, 33, and 35, which project from the focusing-lens frame 21, the variator-lens frame 22, the compensator-lens frame 23, and the lens frame 25, respectively, are inserted into the cam grooves 41, 42, 43, and 45, respectively. When the zooming operation is performed by rotating the zoom ring 40 around the optical axis manually or by an automatic driving mechanism, the cam grooves 41, 42, 43, and 45 move the corresponding lens frames (the focusing-lens frame 21, the variator-lens frame 22, the compensator-lens frame 23, and the lens frame 25) along the optical axis in manners that are determined individually. Accordingly, the cam grooves 41, 42, 43, and 45 serve to move the first to fifth lens groups 11 to 15 along the optical axis in manners that are individually determined. Therefore, the cam grooves 41, 42, 43, and 45 are formed in different patterns.

In the above-described zoom lens device 50, when a zooming operation from the normal state shown in FIG. 10(B) to wide angle is performed, the zoom ring 40 is rotated in a predetermined direction similarly to the first embodiment. Accordingly, as shown in FIG. 10(A), the first lens group 11 moves toward the image along the optical axis due to the shape of the cam groove 41. In addition, the second and fourth lens groups 12 and 14 move toward the object along the optical axis due to the shape of the cam groove 42, so that the distance between the first and second lens groups 11 and 12 and the distance between the first and fourth lens groups 11 and 14 are increased. The third lens group 13 also moves toward the object along the optical axis due to the shape of the cam groove 43, and the fifth lens group 15 slightly moves toward the object along the optical axis due to the shape of the cam groove 45.

When a zooming operation from the normal state shown in FIG. 10(B) to telephoto is performed, the zoom ring 40 is rotated in the opposite direction. Accordingly, as shown in FIG. 10(C), the first lens group 11 moves toward the object along the optical axis due to the shape of the cam groove 41. In addition, the second and fourth lens groups 12 and 14 move toward the image along the optical axis due to the shape of the cam groove 42, so that the distance between the first and second lens groups 11 and 12 and the distance between the first and fourth lens groups 11 and 14 are reduced. The third lens group 13 does not move along the optical axis due to the shape of the cam groove 43, and the fifth lens group 15 also does not move in the optical direction due to the shape of the cam groove 45.

The advantages obtained by the zoom lens device 10 of the fist embodiment may also be obtained by the zoom lens device 50 of the present embodiment. In addition, in the zoom lens device 50 of the present embodiment, not only the first to fourth lens groups but also the fifth lens group 15 is constructed as a moveable lens group. Accordingly, the function of the fifth lens group can be continuously obtained from wide angle to telephoto. More specifically, the fifth lens group 15 can continuously compensate for the field curvature aberration from wide angle to telephoto, and make the zoom lens device 50 an approximately telecentric system from wide angle to telephoto. Thus, according to the structure of the present embodiment, the performance of the zoom lens device 50 can be increased.

Although the zoom lens devices 10 and 50 are used in the projector 1 as the magnification projection system in the above-described embodiments, it should be understood that the present invention may also be applied to zoom lens devices installed in optical apparatuses other than projectors, such as single lens reflex cameras, video cameras, electronic cameras, medical equipment, and the like. In addition, the structure of the projector 1 is not limited to the above-described embodiments. For example, instead of the liquid crystal devices, a modulation device using a micromirror, a CRT, and the like, may also be used as the image forming device.

In addition, although the zoom lens devices 10 and 50 containing five lens groups is explained in the above-described embodiments, it should be understood that the present invention may also be applied to zoom lens devices including six or more lens groups.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A zoom lens device, comprising:
   a variator lens group having two lens groups, the two lens groups move along an optical axis of the zoom lens device during a zooming operation; and
   a compensator lens group disposed between the two lens groups, the compensator lens group moving in association with the variator lens group along the optical axis,
   the two lens groups being retained by a common variator-lens frame and being constructed such that the two lens groups move together, and
   the two lens groups serving to counterbalance the influence of aberration due to decentering.

2. A zoom lens device according to claim 1, further comprising:
   a compensator-lens frame which retains the compensator lens group;
   a plurality of driving pins provided on exterior surfaces of the variator-lens frame and a compensator-lens frame in such a manner that the driving pins project outwardly therefrom; and
   a zoom ring having cam grooves formed therein, the cam grooves receiving and guiding the drive pins, and thereby restricting the movement the variator lens group and the compensator lens group along the optical axis during the zooming operation,
   the variator-lens frame being provided with openings so that the driving pins which project from the compensator-lens frame extend to the cam grooves.

3. A zoom lens device according to claim 1, further comprising, in addition to the variator lens group and the compensator lens group, a lens group which is disposed at a position farthest from an image.

4. A zoom lens device according to claim 3, the lens group disposed at the position farthest from the image being fixed.

5. A zoom lens device according to claim 3, the lens group disposed at the position farthest from the image being constructed as a moveable lens group which is able to move along the optical axis during the zooming operation.

6. A zoom lens device according to claim 1, further comprising:
   a moveable lens group other than the variator lens group and the compensator lens group;
   a lens frame which retains the moveable lens group;
   a plurality of driving pins provided on an exterior surface of the lens frame in such a manner that the driving pins project outwardly therefrom;
   a zoom ring having cam grooves formed therein, which receive and guide the driving pins provided on the lens frame, and thereby restrict the movement of the moveable lens group along the optical axis during the zooming operation.

7. An optical apparatus comprising a zoom lens device according to claim 1.

8. An optical apparatus according to claim 7, further comprising:
   a compensator-lens frame which retains the compensator lens group;
   a plurality of driving pins provided on exterior surfaces of the variator-lens frame and a compensator-lens frame in such a manner that the driving pins project outwardly therefrom; and
   a zoom ring having cam grooves formed therein, the cam grooves receiving and guiding the driving pins, and thereby restricting the movement the variator lens group and the compensator lens group along the optical axis during the zooming operation,
   the variator-lens frame being provided with openings so that the driving pins which project from the compensator-lens frame extend to the cam grooves.

9. An optical apparatus according to claim 5, further comprising, in addition to the variator lens group and the compensator lens group, a lens group which is disposed at a position farthest from an image.

10. An optical apparatus according to claim 9, the lens group disposed at the position farthest from the image being fixed.

11. An optical apparatus according to claim 9, the lens group disposed at the position farthest from the image being constructed as a moveable lens group which is able to move along the optical axis during the zooming operation.

12. An optical apparatus according to claim 7, further comprising:
   a moveable lens group other than the variator lens group and the compensator lens group;
   a lens frame which retains the moveable lens group;
   a plurality of driving pins provided on an exterior surface of the lens frame in such a manner that the driving pins project outwardly therefrom;
   a zoom ring having cam grooves formed therein, which receive and guide the driving pins provided on the lens frame, and thereby restrict the movement of the moveable lens group along the optical axis during the zooming operation.

13. A projector comprising a zoom lens device according to claim 1.

14. A projector according to claim 13, further comprising:
- a compensator-lens frame which retains the compensator lens group;
- a plurality of driving pins provided on exterior surfaces of the variator-lens frame and a compensator-lens frame in such a manner that the driving pins project outwardly therefrom; and
- a zoom ring having cam grooves formed therein, the cam grooves receiving and guiding the driving pins, and thereby restricting the movement the variator lens group and the compensator lens group along the optical axis during the zooming operation,
- the variator-lens frame being provided with openings so that the driving pins which project from the compensator-lens frame extend to the cam grooves.

15. A projector according to claim 13, further comprising, in addition to the variator lens group and the compensator lens group, a lens group which is disposed at a position farthest from an image.

16. A projector according to claim 15, the lens group disposed at the position farthest from the image being fixed.

17. A projector according to claim 15, the lens group disposed at the position farthest from the image being constructed as a moveable lens group which is able to move along the optical axis during the zooming operation.

18. A projector according to claim 13, further comprising:
- a moveable lens group other than the variator lens group and the compensator lens group;
- a lens frame which retains the moveable lens group;
- a plurality of driving pins provided on an exterior surface of the lens frame in such a manner that the driving pins project outwardly therefrom;
- a zoom ring having cam grooves formed therein, which receive and guide the driving pins provided on the lens frame, and thereby restrict the movement of the moveable lens group along the optical axis during the zooming operation.

* * * * *